United States Patent [19]
Nishizawa et al.

[11] Patent Number: 5,781,526
[45] Date of Patent: Jul. 14, 1998

[54] OPTICAL RECORDING MEDIUM HAVING A DISC WITH DEFORMED PITS

[75] Inventors: Akira Nishizawa, Yokohama; Kanji Kayanuma, Hadano, both of Japan

[73] Assignee: Victor Company of Japan, Ltd., Yokohama, Japan

[21] Appl. No.: 800,330

[22] Filed: Feb. 14, 1997

Related U.S. Application Data

[63] Continuation of Ser. No. 544,134, Oct. 17, 1995, Pat. No. 5,617,408.

[30] Foreign Application Priority Data

Oct. 21, 1994 [JP] Japan ................................ 6-282558

[51] Int. Cl.$^6$ ........................................... G11B 7/24
[52] U.S. Cl. ........................................... 369/275.3
[58] Field of Search ................... 369/275.1–275.4, 369/111, 94; 380/4, 21, 26

[56] References Cited

U.S. PATENT DOCUMENTS

| | | | |
|---|---|---|---|
| 4,488,184 | 12/1984 | Kurata | 358/342 |
| 5,016,240 | 5/1991 | Strandjood et al. | 369/275.4 |
| 5,430,281 | 7/1995 | Lentz et al. | 369/275.3 |
| 5,513,260 | 4/1996 | Ryan | 380/3 |
| 5,570,339 | 10/1996 | Nagano | 369/275.3 |
| 5,608,717 | 3/1997 | Ito et al. | 369/275.3 |

*Primary Examiner*—Nabil Hindi
*Attorney, Agent, or Firm*—Lowe, Price, LeBlanc & Becker

[57] ABSTRACT

An optical recording medium includes a transparent substrate having a surface formed with a track of pits. A reflecting layer extends on the surface of the transparent substrate. The pits include first-type pits and second-type pits. The first-type pits are devoid of projecting rims extending along edges thereof while the second-type pits have projecting rims extending along edges thereof.

9 Claims, 2 Drawing Sheets

FIG. 3
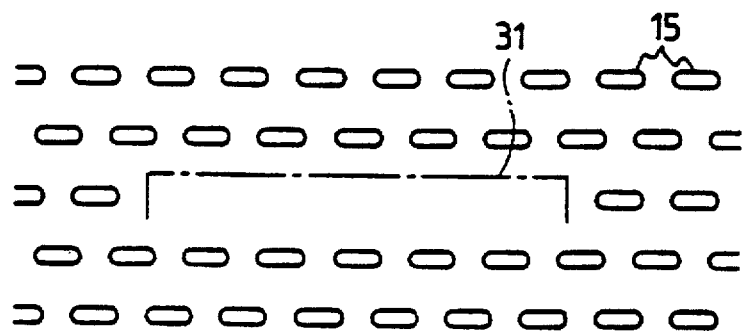
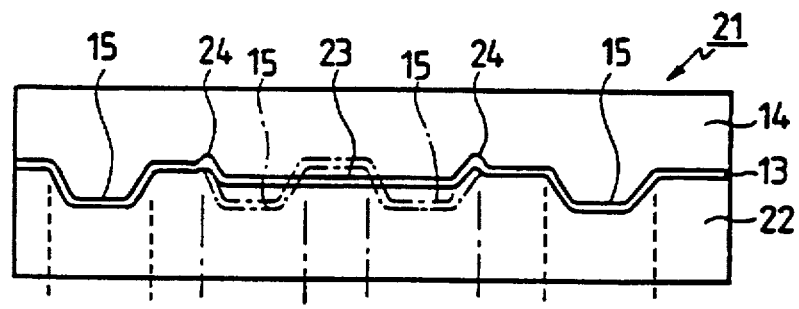
FIG. 4(a)
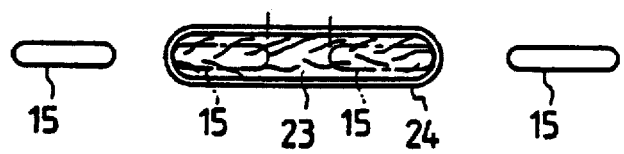
FIG. 4(b)

OPTICAL RECORDING MEDIUM HAVING A DISC WITH DEFORMED PITS

This application is a continuation of application Ser. No. 08/544,134 filed Oct. 17, 1995 now U.S. Pat. No. 5,617,408.

BACKGROUND OF THE INVENTION

1. Field of the Invention

This invention generally relates to an optical recording medium formed with information-corresponding depressions or pits which are sensed by a laser light beam during the reproduction of information therefrom. This invention specifically relates to an optical recording medium which stores information with a security against an illegally reproducing process. This invention also relates to a method of fabricating an optical recording medium.

2. Description of the Prior Art

A general optical recording medium has a transparent substrate formed with small depressions or pits corresponding to stored information. During the reproduction of the information from the recording medium, the depressions or pits are sensed by a laser light beam. A typical example of such an optical recording medium is an optical disc. A CD-ROM (compact disc read-only memory) is one type of the optical disc.

An optical disc of a special type stores first information which can be reproduced by a commercially available device, and second information represented by a secret code which can not be reproduced by the commercially available device. The reproduction of the second information is permitted by using key information related to the secret code. In general, the second information represents document data, image data, or program software. On the other hand, the first information represents an epitome of the second information.

Such an optical disc is handled as follows. A customer can check the epitome of second information in an optical disc by reproducing and monitoring first information before buying the optical disc. After the buy of the optical disc, the customer is supplied with related key information by paying an additional fee.

Another known optical disc has a magnetic layer at a side opposite the optical read side. The magnetic layer generally stores information corresponding to a secret code. Since an optical head of a general reproducing device can not operate on the magnetic layer, a special reproducing device equipped with a magnetic head is required to handle such an optical disc.

Still another known optical disc is provided with a bar code at a label region or an outer edge region which is not scanned by an optical head of a general reproducing device. Generally, the bar code is used as information related to a secret code. A special reproducing device provided with a bar-code reader is required to handle such an optical disc.

SUMMARY OF THE INVENTION

It is an object of this invention to provide an improved optical recording medium.

It is another object of this invention to provide a method of fabricating an improved optical recording medium.

A first aspect of this invention provides an optical recording medium comprising a transparent substrate having a surface formed with a track of pits; and a reflecting layer extending on the surface of the transparent substrate; wherein the pits include first-type pits and second-type pits, and the first-type pits are devoid of projecting rims extending along edges thereof while the second-type pits have projecting rims extending along edges thereof.

A second aspect of this invention is based on the first aspect thereof, and provides an optical recording medium wherein the second-type pits represent information of decoding a code of information represented by the first-type pits.

A third aspect of this invention provides an optical recording medium comprising a transparent substrate having a surface formed with a track of pits and at least one deformed portion; and a reflecting layer extending on the surface of the transparent substrate; wherein a first given area of the transparent substrate contains pits out of said pits and is exclusive of said deformed portion while a second given area of the transparent substrate which differs from the first given area thereof contains said deformed portion and at least one other pit out of said pits, and wherein said deformed portion originates from a pit which is at least partially damaged.

A fourth aspect of this invention is based on the third aspect thereof, and provides an optical recording medium wherein said pit in the second given area represents information of decoding a code of information represented by the pits in the first given area.

A fifth aspect of this invention provides a method of fabricating an optical recording medium which comprises the steps of making a substrate by injection molding which uses a stamper, the substrate having a track of first-type pits, the first-type pits being devoid of projecting rims extending along edges thereof; and forming second-type pits in the substrate by exposing the substrate to a laser light beam, the second-type pits being located in said track and having projecting rims extending along edges thereof.

A sixth aspect of this invention provides a method of fabricating an optical recording medium which comprises the steps of making a substrate by injection molding which uses a stamper, the substrate having first and second given areas formed with pits, wherein the pits in the second given area represents plural different types of key information related to decoding of a code of information represented by the pits in the first given area; and at least partially damaging pits out of the pits in the second given area to delete non-elected ones of the plural types of key information and to elect and leave at least one of the plural types of key information.

BRIEF DESCRIPTION OF THE DRAWINGS

FIG. 3 is a plan view of pits in a part of an optical disc in a state which occurs before the recording of key information thereon.

FIG. 4(a) is a sectional view of a key information recording area in an optical disc of a second embodiment of this invention which is taken along a vertical plane parallel to the direction of a track.

FIG. 4(b) is a plan view of pits in the optical disc of FIG. 4(a).

DESCRIPTION OF THE PREFERRED EMBODIMENTS

First Embodiment

Figure 1:
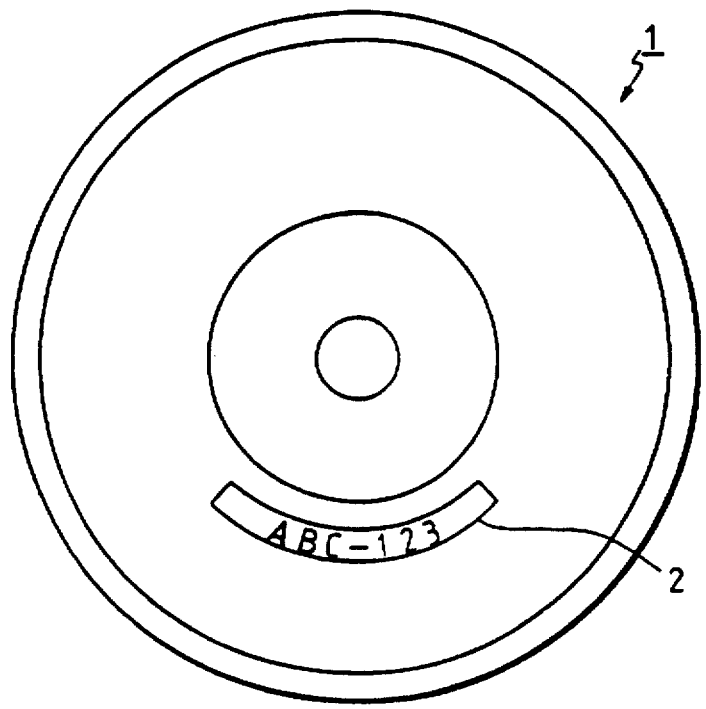
FIG. 1 is a plan view of the label side of an optical disc according to a first embodiment of this invention.

FIG. 1 shows the label side (the label surface) of an optical disc 1 according to a first embodiment of this invention. The label side of the optical disc 1 is opposite the signal read side (the signal read surface) thereof. The optical disc 1 has a track of depressions or pits corresponding to stored information. The stored information is designed so that it can not be recovered by a general reproducing device. To this end, the stored information is represented by, for example, a secret code.

As shown in FIG. 1, management information 2 for the stored information is recorded on the label side of the optical disc 1. The management information 2 is determined in accordance with a method of decoding the secret code of the stored information, that is, a method of recovering the stored information. Generally, a pair of first key information and second key information teaches a method of decoding the secret code of the stored information, that is, a method of recovering the stored information. First key information (first decoding information) is recorded on a key information recording area within a given region of the optical disc 1. Second key information (second decoding information) can be identified by the management information 2. In general, the owner of the optical disc 1 is supplied with the second key information from an optical-disc publisher or producer. Regarding the optical disc 1, the stored information can not be recovered in the absence of the second key information.

It is preferable that first key information is varied from disc to disc. After the base plate (the substrate) of an optical disc 1 is formed by injection molding, first key information is recorded thereon.

Figure 2A:
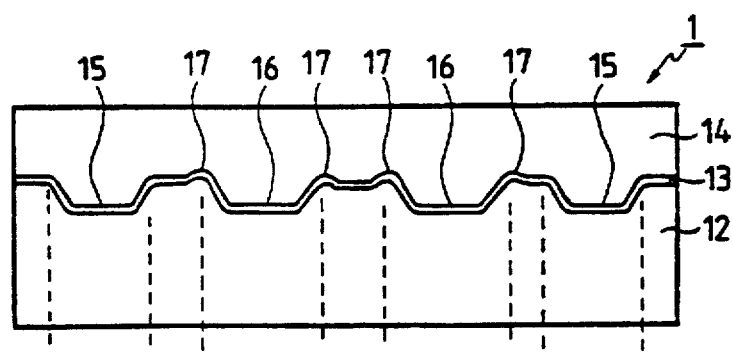
FIG. 2(a) is a sectional view of a key information recording area of the optical disc in FIG. 1 which is taken along a vertical plane parallel to the direction of a track.

FIG. 2(a) is a sectional view of a key information recording area of the optical disc 1 which is taken along a vertical plane parallel to the direction of a track. As shown in FIG. 2(a), the optical disc 1 includes a base plate or a substrate 12. The key information recording area of the optical disc 1 is formed with pits (depressions) 15 and 16 corresponding to first key information. A reflecting layer (film) 13 and a protectively layer (film) 14 are sequentially laminated on the base plate 12. The reflecting layer 13 is made of optically reflecting material.

The pits 15 are formed during injection molding which uses a stamper. The pits 15 do not have upwardly-projecting rims along the edges thereof. After the formation of the base plate 12 by injection molding, the pits 16 are formed by a cutting process which uses a laser light beam. As shown in FIG. 2(a), the pits 16 have upwardly-projecting rims 17 along the edges thereof.

The base plate 12 is made of material which can be deformed by the exposure to a strong laser light beam. The base plate 12 is preferably made of transparent resin such as polycarbonate. The reflecting layer 13 is made of highly reflective metal such as aluminum, gold, or copper. The reflecting layer 13 may be made of an alloy. The reflecting layer 13 consists of a single layer. The protective layer 14 is made of ultraviolet setting resin.

The optical disc 1 is fabricated as follows. A surface of a glass disc for a master disc (an original disc) is coated with a photosensitive film such as a photoresist. A laser light beam representing information to be recorded is applied to the photosensitive film to execute light exposure. Then, the glass disc with the photosensitive film is subjected to a developing process so that pits (depressions) corresponding the information are formed therein. A given area of the photosensitive film which will constitute a key information recording area is prevented from undergoing the light exposure by a suitable technique. Thus, at this stage, the given area is formed with neither a pit nor pits.

In general, the position of the key information recording area is set arbitrarily. The position of the key information recording area may be within a lead-in zone or may be coincident with the position of a head (for example, a header) of program software. An address signal representing the position of the key information recording area is recorded on a suitable zone such as a lead-in zone so that a reproducing device can detect the position of the key information recording area.

An electrically conductive film is formed on the photosensitive film which has the pits. Then, the master glass disc with the electrically conductive film and the photosensitive film is subjected to a plating process to form a stamper. The stamper is set in an injection molding apparatus, and a base plate (a substrate) 12 is formed by the injection molding apparatus. The base plate 12 is made of resin such as polycarbonate. A reflecting film (reflecting layer) 13 is formed on the base plate 12 by a vapor deposition process. The reflecting film 13 is made of metal such as aluminum, gold, or copper. The reflecting layer 13 may be made of an alloy. A protective film (protective layer) 14 is formed on the reflecting film 13 by a spin coat technique. The protective film 14 is made of suitable material such as ultraviolet setting resin.

First key information is recorded on the optical disc 1 as follows. The recording of the first key information is executed by an exclusively-recording apparatus at a suitable stage after the formation of the base plate 12 by injection molding. For example, the stage of the recording of the first key information agrees with one of an interval before the formation of the reflecting film 13, an interval between the formation of the reflecting film 13 and the formation of the protective film 14, and an interval after the formation of the protective film 14.

FIG. 3 shows conditions of pits in the optical disc 1 in a state which occurs before the recording of the first key information thereon. As shown in FIG. 3, the base plate 12 of the optical disc 1 has pits (depressions) 15 formed by injection molding. The pits 15 are arranged along an information recording track or tracks. As shown in FIG. 3, before the recording of the first key information, one information track has an unused area 31 devoid of pits 15. The first key information is recorded on the unused area 31 so that the unused area 31 constitutes the key information recording area.

Figure 2B:
FIG. 2(b) is a plan view of pits in the optical disc of FIG. 2(a).

The optical disc 1 with the unused area 31 is set in a recording apparatus. The recording apparatus includes a device for outputting a laser light beam at a variable power output. The recording apparatus also includes a reproducing section responsive to a reflected laser light beam. The recording apparatus searches the optical disc 1 for the unused area 31. Specifically, the laser light beam with a power of 5 mW continues to be applied to the optical disc 1 via the base-plate side thereof, and an information recording track of pits 15 is scanned thereby to find the unused area 31. When the reproducing section detects the unused area 31, the power of the laser light beam is increased to about 300 mW and tracking conditions of the recording apparatus are fixed to form a pit (a depression) 16 responsive to the first key information. Plural pits (depressions) 16 may be formed in the unused area 31 by repeating the light-power increasing process. As shown in FIGS. 2(a) and 2(b), the pits 16 are different in shape from the pits 15 formed by injection molding in that the pits 16 have upwardly-projecting rims 17 along the edges thereof. The laser light beam for forming the pits 16 is applied from a side of the signal read surface or the signal surface of the optical disc 1.

After the first key information is recorded on the optical disc 1, characters representing the management information 2 are printed on the label side of the optical disc 1. The management information 2 depends on the first key information, and teaches the second key information mating with the first key information. In this way, the optical disc 1 is completed.

An example of the optical disc 1 corresponding to a CD (Compact Disc) was fabricated as follows. A stamper was formed. The stamper had an unused area starting from a track point corresponding to a given CD address. The unused area was about 1 mm long along a track direction. A base plate (a substrate) 12 was formed by an injection molding apparatus provided with the stamper. The base plate 12 had an unused area 31 corresponding to the unused area of the stamper. The base plate 12 was made of polycarbonate. A reflecting layer (film) 13 and a protective layer (film) 14 were sequentially laminated on the base plate 12. The reflecting layer 13 was made of aluminum. The reflecting layer 13 had a thickness of about 60 nm. The protective layer 14 was made of ultraviolet setting resin. The protective layer 14 had a thickness of about 10 µm.

The optical disc 1 with the unused area 31 was set in a recording apparatus. The recording apparatus included a semiconductor laser device for outputting a laser light beam at a variable power output. The laser light beam had a wavelength of 780 nm. The recording apparatus also included a reproducing section responsive to a reflected laser light beam. The recording apparatus searched the optical disc 1 for the unused area 31. Specifically, the laser light beam with a power of 5 mW continued to be applied to the optical disc 1 via the base-plate side thereof, and an information recording track of pits 15 was scanned thereby to find the unused area 31. When the reproducing section detected the unused area 31, the power of the laser light beam was increased to form a pit (a depression) 16 responsive to first key information. It should be noted that plural pits (depressions) 16 may be formed in the unused area 31 by repeating the light-power increasing process. During the formation of the pit 16, the power density of the laser light beam at the surface of the base plate 12 was equal to about 20 mW/µm². During the formation of the pit 16, the linear velocity of the optical disc 1 relative to the laser light beam was equal to about 0.5 m/s.

After the first key information was recorded on the optical disc 1, characters representing management information 2 were printed on a given place in an inner part of the label side of the optical disc 1 by using a rubber stamp. The characters representing the management information 2 were "ABC-123". The management information 2 depended on the first key information, and taught the second key information mating with the first key information. In this way, an example of the optical disc 1 was completed.

When the example of the optical disc 1 was subjected to an information reproducing process by a normal reproducing device, a secret code made it difficult to recover stored information although the first key information was detected.

A reproducing device was prepared which had a decoding table for determining a decoding method in response to both first key information and second key information. In the case where second key information corresponding to the management information "ABC-123" was inputted into this reproducing device and the example of the optical disc 1 was subjected to an information reproducing process thereby, the secret code was decoded into stored information. Thus, in this case, the stored information was recovered.

Optical discs 1 with management information 2 are used as follows. When a user buys an optical disc 1, the user informs an optical-disc producer or publisher of management information 2 on the optical disc 1 and pays an additional fee to the optical-disc producer or publisher. The additional fee relates to the right to use software recorded on the optical disc 1. Then, the optical-disc producer or publisher supplies the user with second key information corresponding to the management information 2. The supplied second key information enables the user to employ the software recorded on the optical disc 1.

It is possible to identify the owner of an optical disc 1 by referring to related management information 2 registered in the optical-disc producer or publisher. It is now assumed that a pirated optical disc is made by copying a legitimate optical disc 1. In this case, the owner of the legitimate optical disc (the original optical disc) 11 used in making the pirated optical disc can be identified by related management information 2. Thus, it is possible to provide a deterrent to an illegally copying process.

According to one example, the relation among first key information (open key information) on an optical disc 1, second key information (secret key information) identified by management information 2, and the recovery of stored information on the optical disc 1 is designed as follows. In the case where an optical disc 1 is set in a reproducing device and the second key information is inputted into the reproducing device, the reproducing device reproduces the first key information from the optical disc 1 and collates the second key information with the reproduced first key information. When the reproducing device detects that the second key information agrees with the first key information, the reproducing device is enabled to recover the stored information on the optical disc 1. On the other hand, when the reproducing device detects that the second key information disagrees with the first key information, the reproducing device can not recover the stored information on the optical disc 1.

A reproducing device for handling an optical disc 1 or another device for using stored information on an optical disc 1 is preferably provided with information representing a method of decoding a secret code of a stored information on the optical disc 1. Such decoding information may be recorded on the optical disc 1 in a manner such that the decoding information can be recovered in a normal way. Alternatively, the decoding information may be supplied from another recording medium such as a magnetic disc, or may be prepared in the reproducing device. First key information on an optical disc 1 may be changed in unit of several discs, several tens of discs, or several hundreds of discs.

An optical disc 1 may be provided with two or more key information recording areas. In the case of an optical disc 1 storing plural different types of software, the optical disc 1 may be provided with key information recording areas, the total number of which is equal to or greater than the total number of the types of software.

An optical disc 1 may be modified into another optical recording medium such as a card-shaped optical recording medium or a tape-shaped optical recording medium.

According to the embodiment of this invention, optical discs which differ from each other in first key information can be made by using a common stamper. Thus, it is possible to provide inexpensive optical discs which are good in stored-information security.

Second Embodiment

FIGS. 4(a) and 4(b) relate to an optical disc 21 according to a second embodiment of this invention. The optical disc 21 is similar to the previously-mentioned optical disc 1 except for design changes indicated hereinafter.

FIG. 4(a) is a sectional view of a key information recording area of the optical disc 21 which is taken along a vertical plane parallel to the direction of a track. As shown in FIG. 4(a), the optical disc 21 includes a base plate or a substrate 22. The key information recording area of the optical disc 21 is formed with pits (depressions) 15 and a deformed portion or portions 23. The pits 15 in the key information recording area correspond to first key information. A reflecting layer (film) 13 and a protectively layer (film) 14 are sequentially laminated on the base plate 22. The reflecting layer 13 is made of optically reflecting material.

The pits 15 are formed during injection molding which uses a stamper. A designated pair of neighboring pits selected from among the pits 15 are damaged and made into a deformed portion 23 by a laser light beam so that the original pits corresponding to the deformed portion 23 can not be detected. Plural designated pairs of neighboring pits may be damaged and made into deformed portions 23. An information piece represented by the original pits corresponding to the deformed portion 23 can not be reproduced. Selection of the designated pair of pits is changed for each of discs so that first key information is varied from disc to disc.

The normal pits 15 do not have upwardly-projecting rims along the edges thereof. On the other hand, the deformed portion 23 has an upwardly-projecting rim 24 along the edges thereof. The deformed portion 23 has wrinkles extending inside the rim 24. During the application of a laser light beam, the wrinkles are caused by the difference in expansion coefficient between the base plate 22 and the reflecting layer 13. In the case where a laser light beam is applied to the base plate 22 without the reflecting layer 13, a deformed portion 23 free from wrinkles can be formed.

A deformed portion 23 may be formed by damaging at least part of a pit 15. Further, a deformed portion 23 may be formed by damaging three or more successive pits 15. Also, in these cases, an information piece represented by the original pit or pits corresponding to the deformed portion 23 can not be reproduced.

The base plate 22 is made of material which can be deformed by the exposure to a strong laser light beam. The base plate 22 is preferably made of transparent resin such as polycarbonate. The reflecting layer 13 is made of highly reflective metal such as aluminum, gold, or copper. The reflecting layer 13 may be made of an alloy. The reflecting layer 13 consists of a single layer. The protective layer 14 is made of ultraviolet setting resin.

The optical disc 21 is fabricated as follows. A surface of a glass disc for a master disc (an original disc) is coated with a photosensitive film such as a photoresist. A laser light beam representing information to be recorded is applied to the photosensitive film to execute light exposure. Then, the glass disc with the photosensitive film is subjected to a developing process so that pits (depressions) corresponding the information are formed therein. A given area of the photosensitive film which will constitute a key information recording area is formed with pits representing plural different types of first key information.

In general, the position of the key information recording area is set arbitrarily. The position of the key information recording area may be within a lead-in zone or may be coincident with the position of a head (for example, a header) of program software. An address signal representing the position of the key information recording area is recorded on a suitable zone such as a lead-in zone so that a reproducing device can detect the position of the key information recording area.

An electrically conductive film is formed on the photosensitive film which has the pits. Then, the glass disc with the electrically conductive film and the photosensitive film is subjected to a plating process to form a stamper. The stamper is set in an injection molding apparatus, and a base plate (a substrate) 22 is formed by the injection molding apparatus. The base plate 22 is made of resin such as polycarbonate. A reflecting film (reflecting layer) 13 is formed on the base plate 22 by a vapor deposition process. The reflecting film 13 is made of metal such as aluminum, gold, or copper. The reflecting layer 13 may be made of an alloy. A protective film (protective layer) 14 is formed on the reflecting film 13 by a spin coat technique. The protective film 14 is made of suitable material such as ultraviolet setting resin.

Final first key information recorded on the optical disc 21 is determined by damaging designated one or ones of pits in the key information recording area as follows. The pit-damaging process is executed by an exclusively-recording apparatus at a suitable stage after the formation of the base plate 22 by injection molding. For example, the stage of the pit-damaging process agrees with one of an interval before the formation of the reflecting film 13, an interval between the formation of the reflecting film 13 and the formation of the protective film 14, and an interval after the formation of the protective film 14.

As previously described, the key information recording area of the optical disc 21 is originally formed with pits representing plural different types of first key information. The optical disc 21 is set in a recording apparatus. The recording apparatus includes a device for outputting a laser light beam at a variable power output. The recording apparatus also includes a reproducing section responsive to a reflected laser light beam. The recording apparatus searches the optical disc 21 for the key information recording area. Specifically, the laser light beam with a power of 5 mW continues to be applied to the optical disc 21 via the base-plate side thereof, and an information recording track of pits 15 is scanned thereby to find the key information recording area. When the reproducing section detects the key information recording area, the power of the laser light beam is increased to about 300 mW to damage a pit or pits 15 corresponding to non-elected types of first key information other than a designated type or types of first key information. The damaged pit or pits 15 result in a deformed portion or portions 23. Thus, the designated type or types of first key information remain in the key information recording area while the other types of first key information are deleted therefrom. The remaining type or types of first key information agree with final first key information recorded on the key information recording area of the optical disc 21.

In the case where the deformed portion or portions 23 are formed before the formation of the reflecting layer 13, the laser light beam is applied to the base plate 22 via its pit side during the information recording process and the pit-damaging process.

After the final first key information recorded on the optical disc 21 is determined, characters representing management information 2 (see FIG. 1) are printed on the label side of the optical disc 21. The management information 2 depends on the first key information, and teaches the second key information mating with the first key information. In this way, the optical disc 21 is completed.

The pit or pits 15 may be mechanically damaged and made into a deformed portion or portions 23 by using a suitable device including, for example, a needle-like member. In this case, the pit-damaging process is preferably executed before the formation of the protective layer 14 but after the formation of the base plate 22 or the formation of the reflecting layer 13.

An example of the optical disc 21 corresponding to a CD (Compact Disc) was fabricated as follows. A stamper was formed. The stamper had a key information recording area at given CD addresses. The key information recording area of the stamper corresponded to a key information recording area of the optical disc 21 which had pits 15 representing a combination of ten numerals as different types of first key information. A base plate (a substrate) 22 was formed by an injection molding apparatus provided with the stamper. The base plate 22 had a key information recording area corresponding to the key information recording area of the stamper. The base plate 22 was made of polycarbonate. A reflecting layer (film) 13 and a protective layer (film) 14 were sequentially laminated on the base plate 22. The reflecting layer 13 was made of aluminum. The reflecting layer 13 had a thickness of about 60 nm. The protective layer 14 was made of ultraviolet setting resin. The protective layer 14 had a thickness of about 10 μm.

The optical disc 21 with the key information recording area was set in a recording apparatus. The recording apparatus included a semiconductor laser device for outputting a laser light beam at a variable power output. The laser light beam had a wavelength of 780 nm. The recording apparatus also included a reproducing section responsive to a reflected laser light beam. The recording apparatus searched the optical disc 21 for the key information recording area. Specifically, the laser light beam with a power of 5 mW continued to be applied to the optical disc 21 via the base-plate side thereof, and an information track of pits 15 was scanned thereby to find the key information recording area. When the reproducing section detected the key information recording area, the power of the laser light beam was increased to damage and make pits 15, representing eight numerals, into a deformed portion or portions 23. Thus, pits 15 in the key information recording area were separated into first pits damaged and made into a deformed portion or portions 23 and second pits remaining as they were. The damaged pits corresponded to the eight numerals while the remaining pits corresponded to the two other numerals. Accordingly, final first key information recorded on the key information recording area was determined which corresponded to the two remaining numerals. Thus, a designated type or types of first key information remained in the key information recording area while the other types of first key information were deleted therefrom. During the pit-damaging process, the power density of the laser light beam at the surface of the base plate 22 was equal to about 10 mW/μm2. During the pit-damaging process, the linear velocity of the optical disc 21 relative to the laser light beam was equal to about 0.5 m/s.

After the final first key information recorded on the optical disc 21 was determined, characters representing management information 2 were printed on a given place in an inner part of the label side of the optical disc 21 by using a rubber stamp. The characters representing the management information 2 were "ABC-123". The management information 2 depended on the final first key information, and taught the second key information mating with the final first key information. In this way, an example of the optical disc 21 was completed.

When the example of the optical disc 21 was subjected to an information reproducing process by a normal reproducing device, a secret code made it difficult to recover stored information although the final first key information was detected. In this case, the deleted types of first key information were not detected.

A reproducing device was prepared which had a decoding table for determining a decoding method in response to both first key information and second key information. In the case where second key information corresponding to the management information "ABC-123" was inputted into this reproducing device and the example of the optical disc 21 was subjected to an information reproducing process thereby, the secret code was decoded into stored information. Thus, in this case, the stored information was recovered.

Optical discs 21 with management information 2 are used as follows. When a user buys an optical disc 21, the user informs an optical-disc producer or publisher of management information 2 on the optical disc 21 and pays an additional fee to the optical-disc producer or publisher. The additional fee relates to the right to use software recorded on the optical disc 21. Then, the optical-disc producer or publisher supplies the user with second key information (secret key information) corresponding to the management information 2. The supplied second key information enables the user to employ the software recorded on the optical disc 21.

It is possible to identify the owner of an optical disc 21 by referring to related management information 2 registered in the optical-disc producer or publisher. It is now assumed that a pirated optical disc is made by copying a legitimate optical disc 21. In this case, the owner of the legitimate optical disc (the original optical disc) 21 used in making the pirated optical disc can be identified by related management information 2. Thus, it is possible to provide a deterrent to an illegally copying process.

According to one example, the relation among first key information (open key information) on an optical disc 21, second key information (secret key information) identified by management information 2, and the recovery of stored information on the optical disc 21 is designed as follows. In the case where an optical disc 21 is set in a reproducing device and the second key information is inputted into the reproducing device, the reproducing device reproduces the first key information from the optical disc 21 and collates the second key information with the reproduced first key information. When the reproducing device detects that the second key information agrees with the first key information, the reproducing device is enabled to recover the stored information on the optical disc 21. On the other hand, when the reproducing device detects that the second key information disagrees with the first key information, the reproducing device can not recover the stored information on the optical disc 21.

A reproducing device for handling an optical disc 21 or another device for using stored information on an optical disc 21 is preferably provided with information representing a method of decoding a secret code of a stored information on the optical disc 21. Such decoding information may be recorded on the optical disc 21 in a manner such that the decoding information can be recovered in a normal way. Alternatively, the decoding information may be supplied from another recording medium such as a magnetic disc, or may be prepared in the reproducing device. First key information on an optical disc 21 may be changed in unit of several discs, several tens of discs, or several hundreds of discs.

An optical disc 21 may be provided with two or more key information recording areas. In the case of an optical disc 21 storing plural different types of software, the optical disc 21 may be provided with key information recording areas, the total number of which is equal to greater than the total number of the types of software.

An optical disc 21 may be modified into another optical recording medium such as a card-shaped optical recording medium or a tape-shaped optical recording medium.

According to the embodiment of this invention, optical discs which differ from each other in first key information can be made by using a common stamper. Thus, it is possible to provide inexpensive optical discs which are good in stored-information security.

What is claimed is:

1. An optical recording medium comprising:
   a track of pits representing key information and secret code words of main information, the key information relating to a method of decoding the secret code words into the main information; and
   a label surface on which management information is recorded, the management information depending on the key information.

2. An optical recording medium comprising:
   a track of pits representing key information and secret code words of main information, the key information relating to a first part of a method of decoding the secret code words into the main information; and
   a label surface on which management information is recorded, the management information depending on the key information and relating to a second part of the method of decoding the secret code words into the main information, the second part being different from the first part.

3. An optical recording medium comprising:
   a transparent substrate having a surface formed with a track of pits, the pits representing first key information and secret code words of main information;
   a reflecting layer extending on the surface of the transparent substrate; and
   a protective layer extending on the reflecting layer and having a label surface on which management information is recorded;
   wherein the management information relates to second key information, and a combination of the first key information and the second key information teaches a method of decoding the secret code words into the main information.

4. An optical recording medium as recited in claim 1, wherein said secret code words of main information are recorded in a first given area of the medium and said key information is recorded in a second given area of the medium.

5. An optical recording medium as recited in claim 1, wherein said secret code words of main information and said key information are recorded in a single track of pits.

6. An optical recording medium as recited in claim 2, wherein said secret code words of main information are recorded in a first given area of the medium and said key information is recorded in a second given area of the medium.

7. An optical recording medium as recited in claim 2, wherein said secret code words of main information and said key information are recorded in a single track of pits.

8. An optical recording medium as recited in claim 3, wherein said secret code words of main information are recorded in a first given area of the medium and said key information is recorded in a second given area of the medium.

9. An optical recording medium as recited in claim 3, wherein said secret code words of main information and said key information are recorded in a single track of pits.

* * * * *